United States Patent [19]

Braut et al.

[11] Patent Number: 5,078,429
[45] Date of Patent: Jan. 7, 1992

[54] RAPID CONNECTION FLUID COUPLING HAVING SHUTTER AND TOOL USED THEREFOR

[75] Inventors: Patrick Braut, La Poueze; Gilles Briet, Gueugnon, both of France

[73] Assignee: Hutchinson, Paris, France

[21] Appl. No.: 363,051

[22] Filed: Jun. 8, 1989

[30] Foreign Application Priority Data

Jun. 14, 1988 [FR] France ................ 88 07898
Dec. 1, 1988 [FR] France ................ 88 15747

[51] Int. Cl.5 ............................ F16L 35/00
[52] U.S. Cl. ........................ 285/4; 285/39; 285/319; 285/320; 285/921; 285/174
[58] Field of Search ............ 285/3, 4, 23, 39, 110, 285/379, 319, 921, 174; 403/225

[56] References Cited

U.S. PATENT DOCUMENTS

| 1,933,117 | 10/1933 | Markle | 285/3 |
|---|---|---|---|
| 2,460,981 | 2/1949 | Francisco, Jr. et al. | 403/225 X |
| 2,933,333 | 4/1960 | Bredtschneider et al. | 285/3 |
| 3,391,951 | 7/1968 | Miller | 285/3 |
| 3,439,943 | 4/1969 | Thorne-Thomsen | 285/321 X |
| 3,532,131 | 6/1970 | Lefere | 285/49 |
| 3,826,523 | 7/1974 | Eschbaugh | 285/319 X |
| 3,837,687 | 9/1974 | Leonard | 285/320 X |
| 3,844,585 | 10/1974 | Sands et al. | 285/3 |
| 4,022,496 | 5/1977 | Crissy et al. | 285/3 |
| 4,119,112 | 10/1978 | Adler | 137/68 R |
| 4,123,090 | 10/1978 | Kotsakis et al. | 285/39 |
| 4,240,651 | 12/1980 | Mariaulle | 285/39 |
| 4,541,658 | 9/1985 | Bartholomew | 285/319 |
| 4,749,214 | 6/1988 | Hoskins et al. | 285/4 |

FOREIGN PATENT DOCUMENTS

| 7324437 | 6/1973 | Fed. Rep. of Germany. |
| 2453237 | 5/1976 | Fed. Rep. of Germany. |
| 7920496 | 7/1979 | Fed. Rep. of Germany. |
| 711965 | 9/1931 | France ................ 403/225 |
| 2089400 | 1/1972 | France. |

Primary Examiner—Dave W. Arola
Attorney, Agent, or Firm—Bell, Seltzer, Park & Gibson

[57] ABSTRACT

A rapid connection fluid coupling includes first and second end pieces. The first end piece is adapted for fitting to a duct or the like such as in the cooling liquid circuit of a motor vehicle engine. The first end piece includes a closure or seal coaxially positioned therein for sealing the flow path through the first end piece when the second piece is not connected thereto. A perforator is supported by the first end piece and positioned in the fluid passageway of the first end piece for perforating the closure when the second end piece is interconnected to the first end piece.

11 Claims, 7 Drawing Sheets

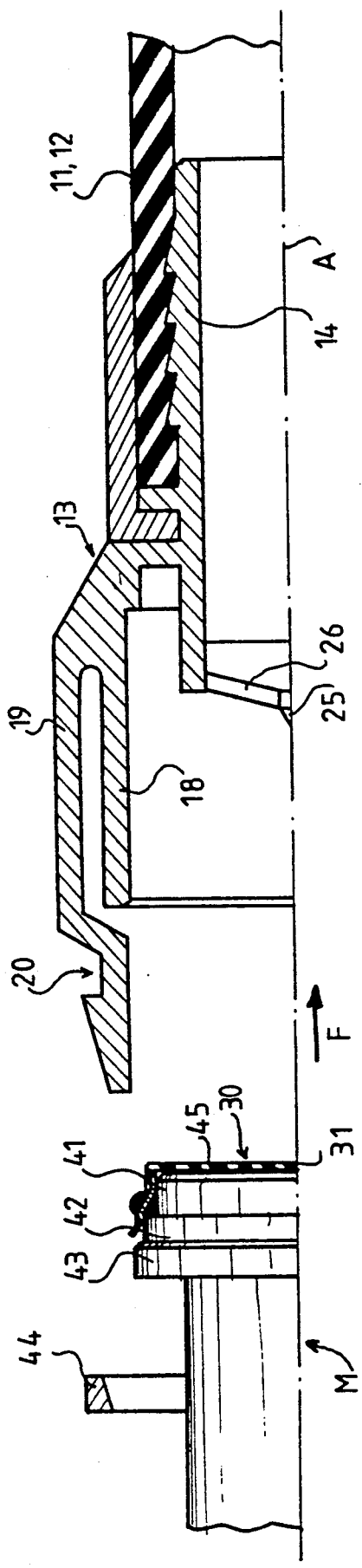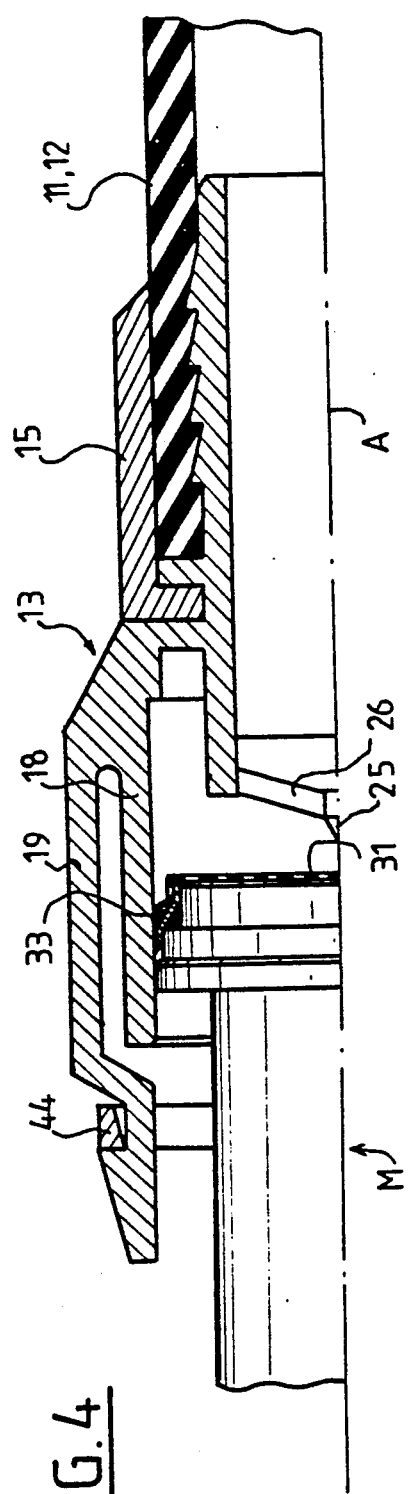

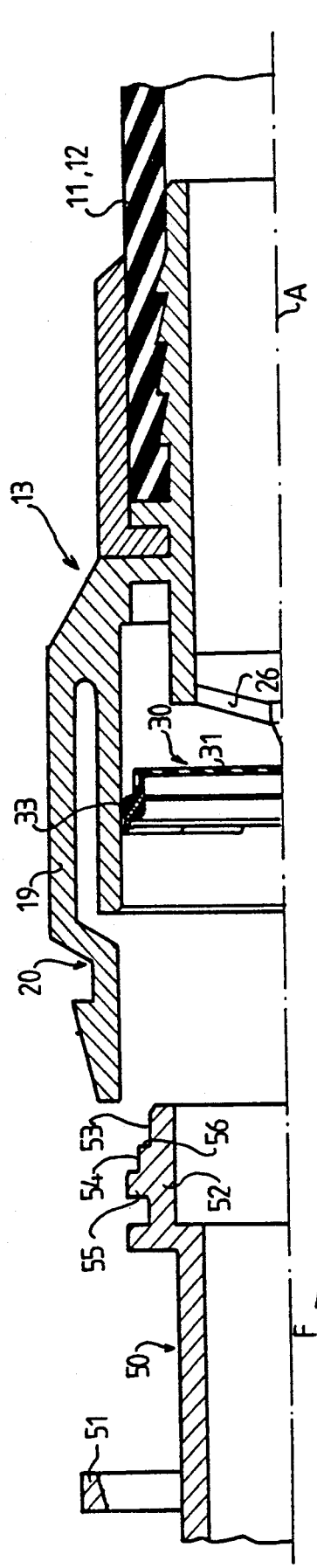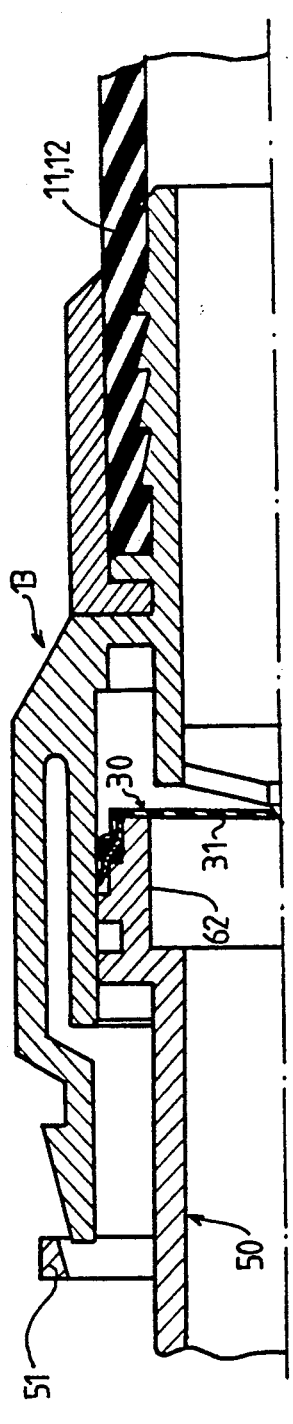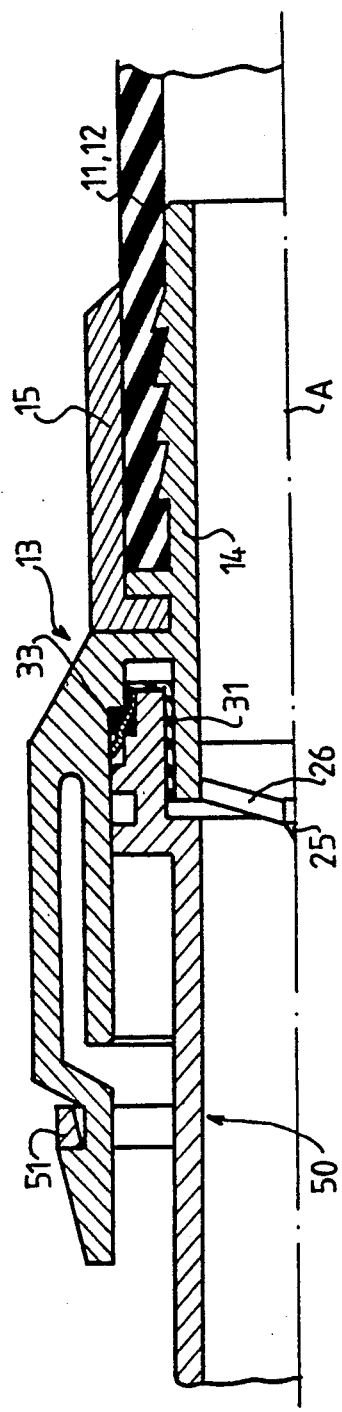

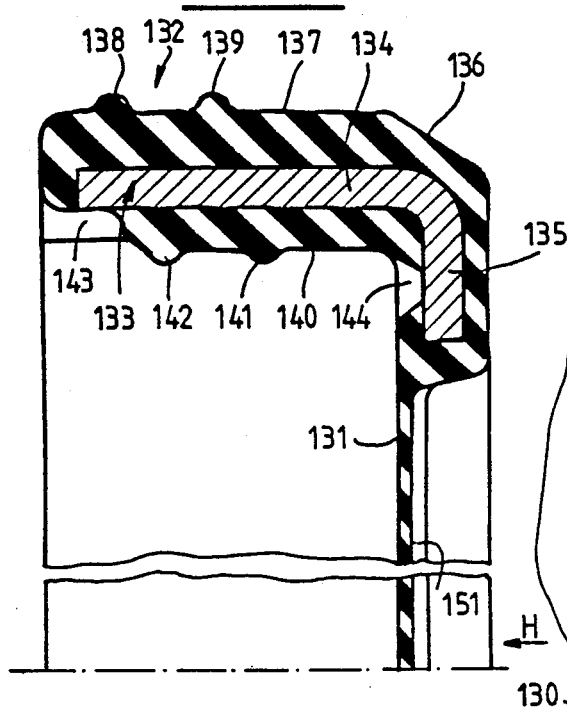
FIG. 12
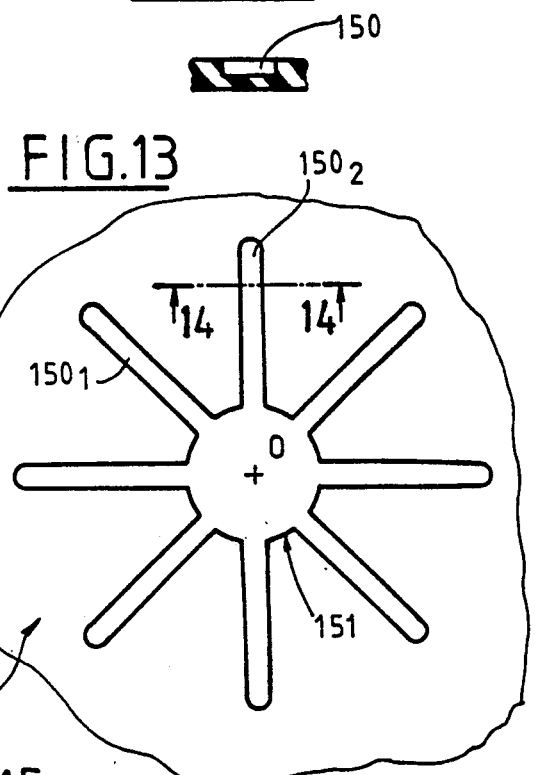
FIG. 14
FIG. 13
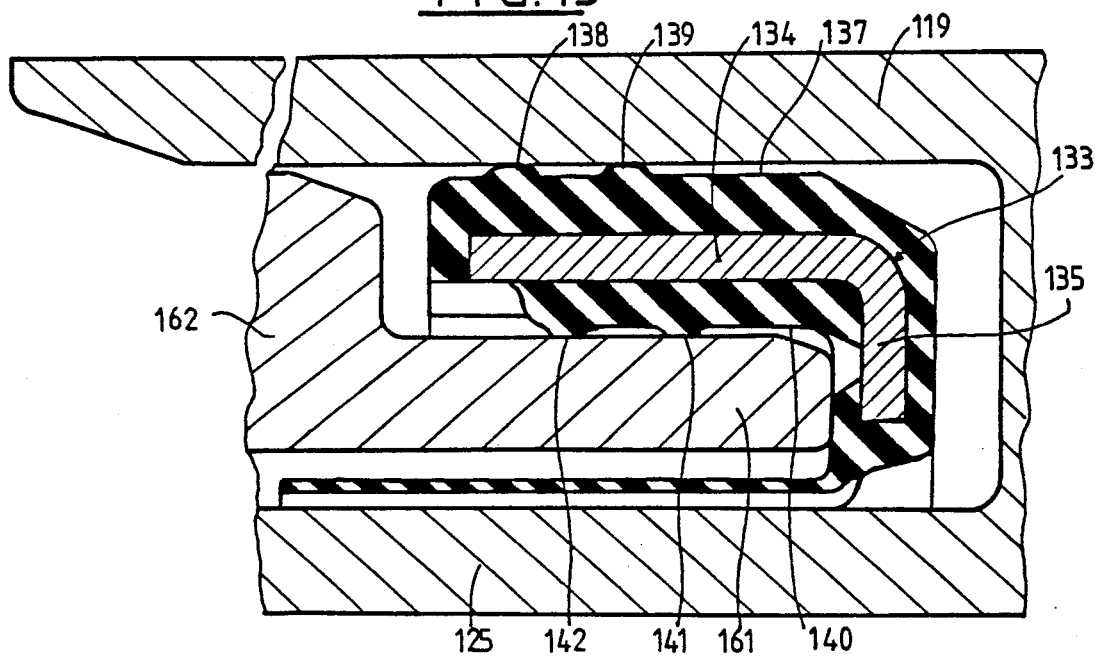
FIG. 15

RAPID CONNECTION FLUID COUPLING HAVING SHUTTER AND TOOL USED THEREFOR

This invention relates to a rapid connection fluid coupling having a closure and a tool for inserting the closure therein.

BACKGROUND OF THE INVENTION

The assembly of fluid circuits, in particular cooling liquid circuits of a motor vehicle engine, constitutes an operation which considerably increases production costs, particularly when inspection tests show up defects. Motor vehicle manufactures, which are desirous of reducing unit vehicle assembly costs, look for ways of escaping from the drawbacks related to conventional connection devices based on collars, or the like.

Consequently, an object of the invention is to provide a rapid connection fluid coupling, in particular for the cooling circuit of a motor vehicle engine, which makes it possible to considerably reduce the cost of assembling an engine on the bodywork that is to receive it.

Another object of the invention is to provide such a rapid connection fluid coupling which makes it possible, if necessary, to disassemble its component parts without damage and which is also highly reliable, particularly with respect to static sealing.

Another object of the invention is to provide a rapid connection fluid coupling, which requires little or no effort to be exerted when assembling it.

Another object of the invention is to provide a tool for inserting a closure within a rapid connection fluid coupling at little expense.

SUMMARY OF THE INVENTION

The present invention provides a rapid connection fluid coupling in particular for connecting a first end piece having a duct or hose connected thereto in the cooling liquid circuit of a motor vehicle engine to an end piece of a test circuit, to a heater unit, or to another vehicle component, wherein said first end piece includes means for perforating a closure or seal suitable for being put into place in said first end piece prior to the engine being filled with said cooling liquid.

The closure or seal may be constituted by a membrane gasket made of elastomer material such as rubber or the like, having the general shape of a cup whose rim is shaped to constitute beading advantageously having a right cross section which is circular and molded over a reinforcement member.

In one embodiment, the generally cup-shaped membrane gasket of the closure has a bottom surface having zones of weakness for facilitating tearing thereof, said zones being advantageously disposed in a star pattern having branches radiating from a center.

The invention provides for the reinforcement member to be generally frustoconical in shape with a cylindrical end adjacent to the side wall of the membrane and a free end shaped in tongues which are inclined relative to the axis of the closure.

In a preferred embodiment, the side wall of the membrane is molded over a reinforcement member whose cross section is L-shaped with the outside face of the membrane at least, and preferably with its inside face as well, having annular sealing ribs.

The ribs of the outside face may be offset longitudinally relative to the ribs of the inside face.

Notches may be provided on the inside face of the side wall, i.e. the face for cooperating with a male connector of the membrane support, said notches being advantageously disposed at the free edge of said side wall and in the zone where said side wall connects with the bottom zone, per se.

The first end piece may include resiliently deformable tabs whose ends are shaped into hooks for holding and positioning a mandrel for putting the shutter into place, or of an end piece for cooperating therewith.

In the preferred embodiment of the invention, the resiliently deformable tabs surround a sleeve connected via a radial flange to a ferrule for fixing to the hoses or ducts of the first end piece.

The invention also provides a tool for mounting the closure in the first end piece connected to a duct or hose associated with the engine prior to the engine being filled with cooling liquid; complementary means on said first end piece and on a second end piece for interconnecting said end pieces during mutual displacement towards each other; means on said second end piece for driving the closure together therewith during said mutual displacement prior to its being put into place in the first end piece; and complementary means on said first end piece for perforating the shutter when the second end piece is interconnected to the first end piece.

The invention also provides a closure suitable for use in a connection device as described above. The closure advantageously comprises a metal ring which is generally frustoconical in shape or which has an L-shaped right cross section having a membrane of elastomer material such as rubber or analogous material partially molded thereover, said membrane being shaped into a cup-shape whose rim includes beading or excess thickness.

BRIEF DESCRIPTION OF THE DRAWINGS

Embodiments of the invention are described by way of example with reference to the accompanying drawings, in which:

FIGS. 3 and 4 show steps of inserting the closure into the first end piece;

FIGS. 5, 6 and 7 show steps of inserting the second end piece into the first end piece;

FIG. 12 is an enlarged fragmentary sectional view of a closure shown in FIGS. 10 and 11;

FIG. 13 is a sectional view along arrow H of FIG. 12;

FIG. 14 is an enlarged sectional view taken along line 14—14 of FIG. 13; and

FIG. 15 is an enlarged fragmentary view of the coupling after interconnection of first and second end pieces.

DETAILED DESCRIPTION OF THE PREFERRED EMBODIMENT

Figure 1:
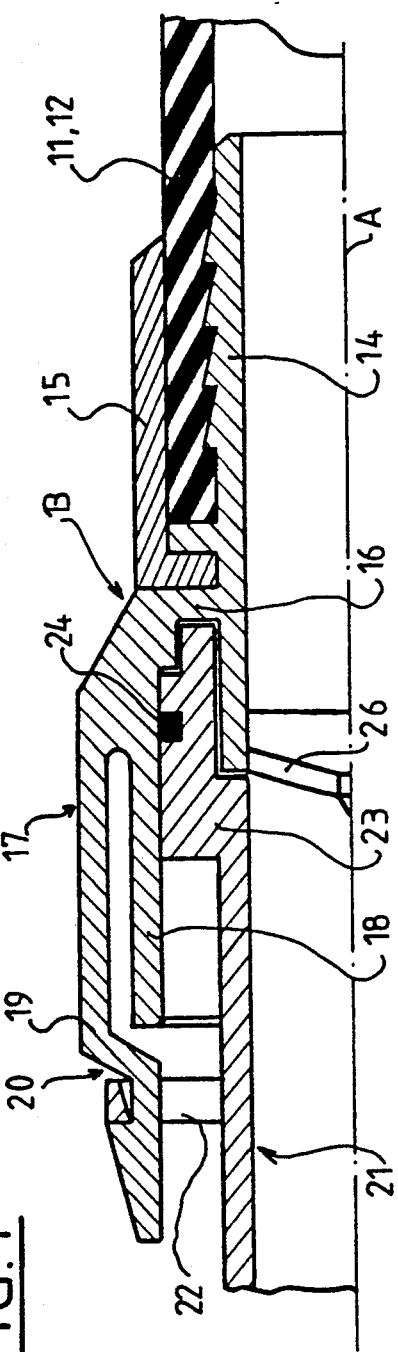
FIG. 1 is a longitudinal half section through a rapid connection fluid coupling in accordance with the present invention.
Figure 2:
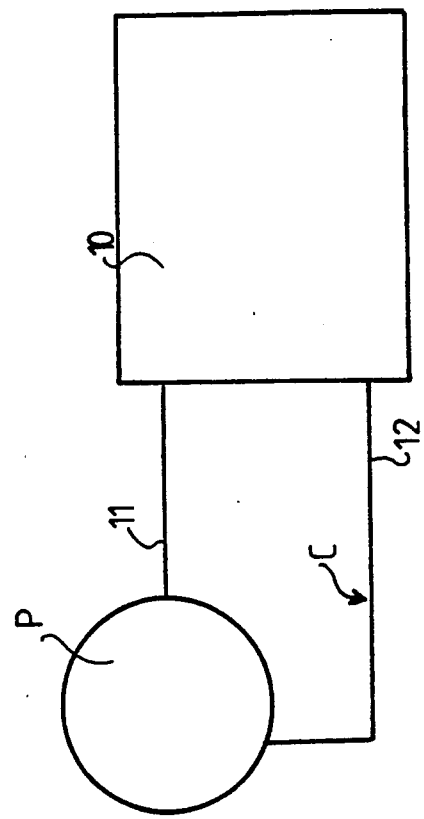
FIG. 2 is a schematic diagram of a test circuit for a motor vehicle engine.

Reference is made initially to FIGS. 1 to 9 for describing a first embodiment of a rapid connection fluid coupling of the invention for fitting to ducts or hoses 11 and 12 of a motor vehicle engine 10 which, prior to assembly in the vehicle, is tested on a bench including a cooling liquid circuit C driven by a pump P (see FIG. 2). During testing, the free ends of the hoses such as 11 and 12 are fitted with respective end pieces 13 (see FIG. 1) each constituting one of the component parts of a coupling of the invention. The coupling includes first and second end pieces. The first end piece includes a cylindrical inner ferrule 14 which cooperates with a ring 15 in order to clamp and fix it to a hose such as 11 or 12, together with an appendix 17 connected to the ferrule 14 by a radial flange 16. The appendix 17 is constituted by an inner sleeve 18 disposed about the same axis A of the fluid coupling and which is in turn surrounded by tabs 19 of greater length than the sleeve and having free ends in the form of hook shapes 20. The substance from which the end piece 13 is made, and the way in which the tabs are attached to the sleeve 18 are chosen in such a manner that said tabs are resiliently deformable to move towards and away from the axis A, thereby enabling the end piece 13 to be easily connected to an end piece having a hook-engaging collar 22 and a head 23 which is shaped to match the cross section of the end piece between its ferrule 14, the sleeve 18 and the flange 16, said head 23 carrying a sealing O-ring 24.

In the assembled condition as shown in FIG. 1, the cooling fluid thus flows without obstruction through the end pieces 21 and 13, with the end piece 13 further carrying a striker or perforator 25 (FIG. 2) at the free end of its ferrule 14 and held on the axis A by means of radial arms 26 which allow uninterrupted fluid flow around the arms (FIGS. 5-7).

The end piece 21 in the above-described structure is detached very simply from the end piece 13 once engine testing is over, merely by pressing against the ends of the hooks 20, thereby enabling the cooling liquid to be emptied from the engine prior to sending the engine to the factory where it will be assembled in the vehicle which is to receive it.

Figure 8:
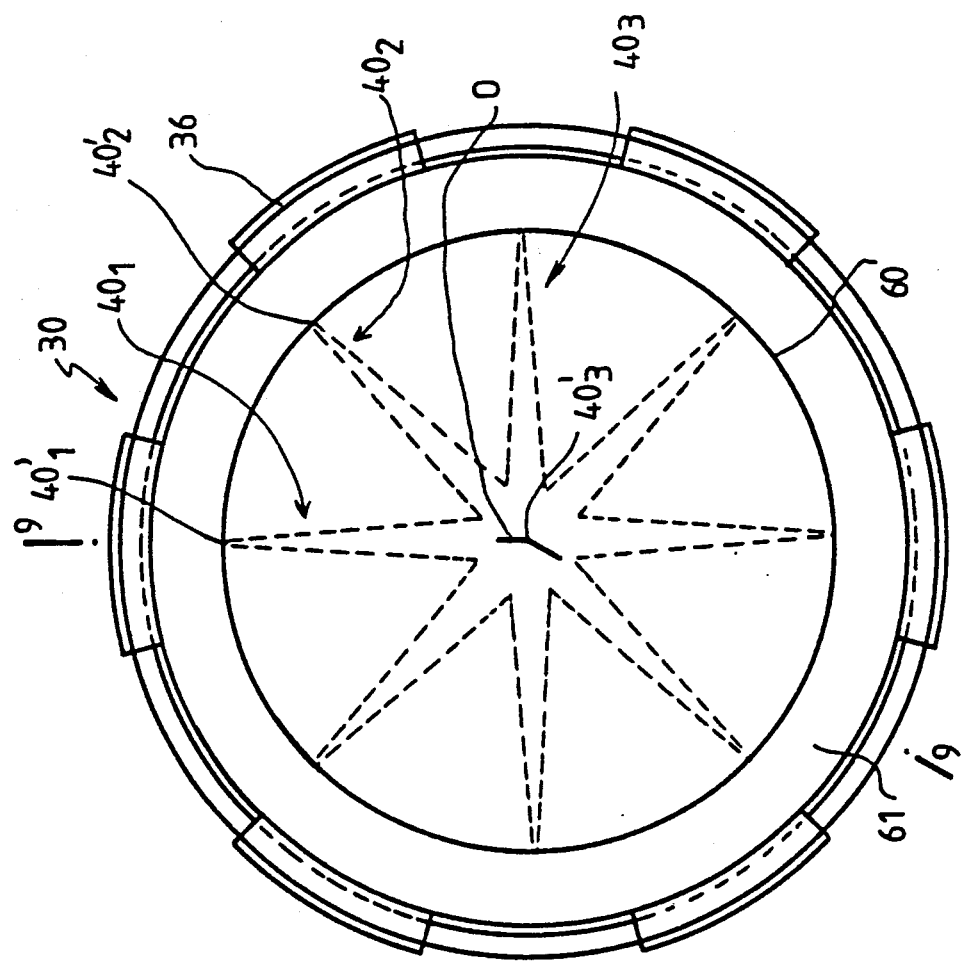
FIG. 8 is an elevation view of a closure for coupling of the present invention.
Figure 9:
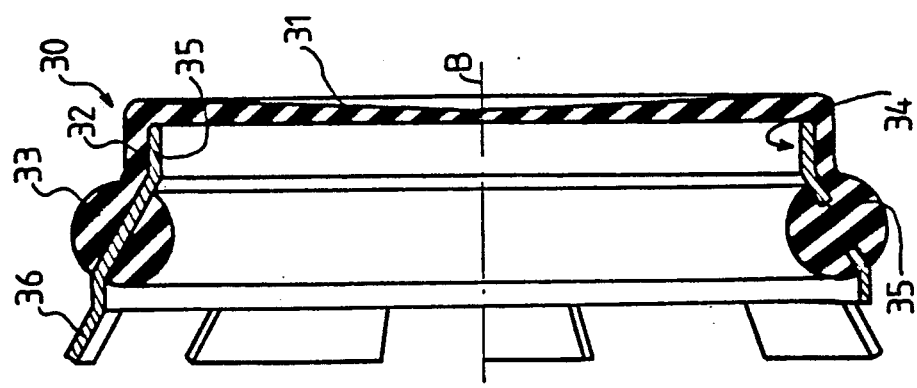
FIG. 9 is a section view on line 9—9 of FIG. 8.

When the engine is again to be filled with cooling liquid in the vehicle-assembly factory, but without there being any intention subsequently to empty the cooling liquid from the engine, the first end piece 13 is associated with a closure or seal 30 (see FIGS. 3 to 9). The closure or seal which is particularly clearly visible in FIGS. 8 and 9, is constituted in a first embodiment of the invention by a membrane gasket made of an elastomer material such as rubber or similar material and shaped in the form of a cup having a bottom 31 and a side wall 32 whose rim is of increased thickness to constitute peripheral beading 33 which is advantageously circular in section. The beading is molded onto a metal reinforcement member 34 which is generally frustoconical in shape and includes a plurality of punched notches 35 in order to provide good adhesion with the elastomer material constituting the beading 33. A cylindrical end of the metal reinforcement member lies inside the wall 32 of the membrane and is adjacent thereto. The free, other end of the metal reinforcement member comprises tongues 36 which slope relative to the longitudinal axis B of the membrane and which are uniformly distributed angularly around said axis.

In accordance with another characteristic of the invention, the bottom 31 of the membrane gasket closure 30 is constructed with zones that are weaker than the remainder of the membrane, e.g. by being thinner, said zones being intended to ensure that the membrane is torn uniformly in a manner described below and being disposed in a regular star pattern about a center O which coincides with the center of the bottom 31 and which has radiating arms $40_1$, $40_2$, $40_3$, ..., etc. extending from the center towards the periphery and tapering to tips $40'_1$, $40'_2$, $40'_3$, ..., etc. which define a circle 60 delimiting, together with the outer periphery of the membrane, a ring 61. In order to enable the engine to be filled with cooling liquid in the vehicle assembly factory, the seal or closure 30 is initially applied to a tool in accordance with the present invention which includes a mandrel M (FIGS. 3 and 4) whose free end is shaped to provide three coaxial bearing surfaces 41, 42 and 43 of increasing diameter, with the body of the mandrel bearing a collar 44 analogous to the collar 22 of the end piece 21 but at a distance from the front face 45 of the leading bearing surface 41 of the mandrel M such that when said collar cooperates with the hooks 20 of the end piece 13, the membrane 31 of the closure 30 is at a distance from the perforator 25. In order to put the closure into place in the end piece 13, the end piece is merely moved axially towards the mandrel M by translation motion along the direction of arrow F until the hooks 20 of the tabs 19 on the end piece 13 engage within the collar 44 of said mandrel. This condition is shown in FIG. 4 where the closure 30 is received inside the sleeve 18 of the end piece 13 at a distance from the perforator 25 and, the beading 33 then acts as a sealing ring while simultaneously the tongues 36 are pressed against the sleeve 18 to retain the closure. When the engine is filled with cooling liquid and put under pressure in order to detect any possible leaks, the tongues 36 oppose any tendency of the closure to escape from the sleeve 18 even after the mandrel M has been removed leaving the closure in place in the end piece 13, i.e., when the condition shown in FIG. 5 has been reached.

Thereafter, when the motor filled with cooling liquid is to be assembled in a vehicle in a manufacturing line, it is initially put into place in the engine compartment and the cooling liquid circuit is then established by connecting the end piece 13 to the end piece 50 of a heater unit, thereby simultaneously eliminating the obstacle to cooling liquid flow constituted by the closure 30. To accomplish this, the end piece 50 which is provided with a collar 51 analogous to the collars 22 and 44 and whose head 52 is shaped on its outer side surface with bearing surfaces 36 to 55 analogous to the bearing surfaces 41 to 43 on the mandrel M, is inserted into the end piece 13 by being displaced axially in the direction of arrow F. During this insertion, the head 52 of the end piece comes into contact with the shutter 30 until the beading 33 thereof rests against the bearing surface 53 in abutment against the shoulder 56 between said bearing surface and the bearing surface 54, such that as the insertion motion continues, the end piece 50 moves the closure 30 towards the perforator 25 until it reaches the position shown in FIG. 6 where the perforator begins to tear the membrane 31 at its center O. As the end pieces 13 and 50 continue to be moved towards each other, the initial tear expands along the lines of weakness in the branches 40 in order to open the closure 30 out as far as the tips $40'_1$, $40'_2$, $40'_3$, ..., etc, of the branches 40.

When the end piece 50 has been completely inserted into the end piece 13, i.e., when the condition shown in FIG. 7 has been reached in which the hooks 22 of the tabs 19 cooperate with the collar 51, then the membrane 31 of the closure 30 is received between the outside surface of ferrule 14 and the inside surface 62 of the head 52 of the end piece 50, with the beading 33 providing sealing between the two end pieces, as does the remainder of the membrane which is totally withdrawn from the cooling liquid flow path between the heater unit and the hoses 11, 12 connected to the engine.

Reference is now made to FIGS. 10 to 15 showing another embodiment of a device for fitting to the hose 111 of an engine (not shown) which, prior to being assembled in a vehicle, is bench tested on a bench including a cooling liquid circuit which terminates at one end by a hose 112 which constitutes one of the component parts of a rapid connection fluid coupling of the invention. This coupling comprises a cylindrical inner ferrule 114 disposed about an axis A, analogous to the ferrule 114 of the preceding embodiment, with the hose 111 being fitted thereover and held in position by a ring 115. The ferrule 114 has an outwardly directed flange 116 against which the hose 111 comes into abutment, and it has a second outwardly directed flange 117 of larger diameter than the first and forming the bottom of a space V which is delimited on the inside by a tube 118 extending the ferrule 114, and on the outside by an end piece 119 constituting the female part of the connection and carrying means 120, e.g. resilient tabs, for releasably connecting it to the male portion 121 of the connection and including hose 112.

Figure 10:
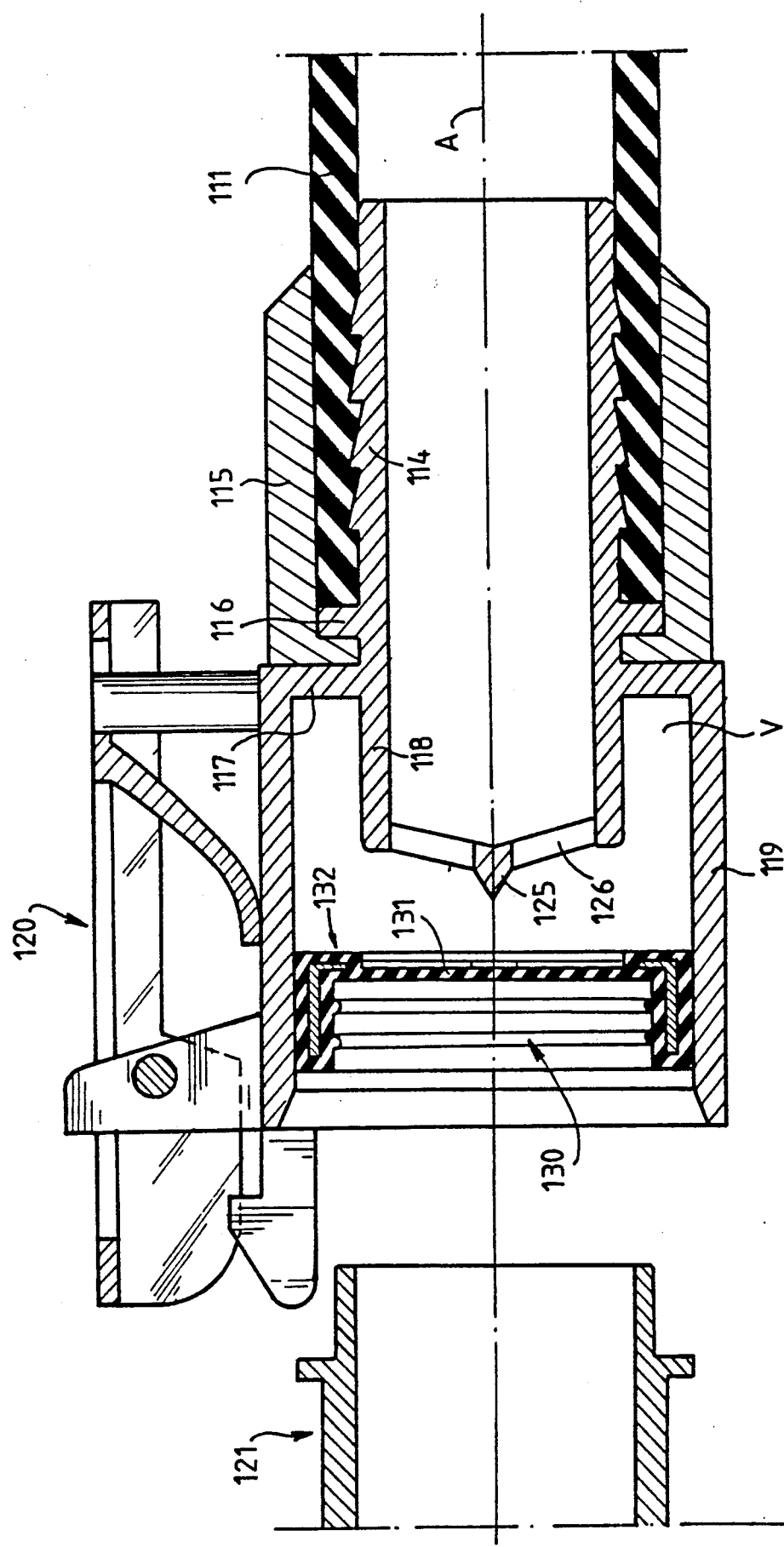
FIG. 10 is a diagrammatic, longitudinal section view showing a second embodiment of the rapid connection fluid coupling of the present invention shown prior to the interconnection of first and second end pieces.

As in the device shown in FIGS. 1 to 9, the tube 118 has an axial perforator 126 at its end held by radial arms 126, and in a manner analogous to that described above, a closure 130 is associated with the end piece 119 in its condition prior to a connection being established for constituting the cooling liquid circuit, i.e., as shown in FIG. 10.

As is clearly visible in FIGS. 12, 13, and 14, the closure 130 is constituted by a membrane gasket made of elastomer material such as rubber or an analogous material and shaped in the form of a cup having a bottom 131 and a side wall 132 molded over a metal reinforcement member 133 whose right half-section is L-shaped having an axial long portion 134 and a radial short portion 135. As can be seen in FIG. 12, the face of the gasket facing the perforator 125 has a conical surface 136 where the bottom 131 per se meets the side wall, and the side wall has sealing ribs 138 and 139 on its outside face 137 and has sealing ribs 141 and 142 on its inside face 140, with the inside and outside ribs being axially offset relative to one another.

On said inside face 140, the side surface molded over the reinforcement member 133 also has notches 143 and 144, with the notches 143 being at the rim of the side wall and with the notches 144 overlying the junction between the side wall and the bottom 131. The notches are intended to prevent the reinforcement member from deforming during molding. The bottom or membrane 131 is made with zones of weakness which are weaker than the remainder of the membrane, e.g. because they are thinner (FIG. 14), with said zones being intended to ensure that the membrane tears uniformly. These zones are disposed in a uniform star pattern about the center O which coincides with the center of the bottom 131, and it has radial branches $150_1$, $151_2$, $150_3$, etc. extending from a circular central zone 151 (which is also of reduced thickness) out to the portion of greatest thickness which is molded over the radial short branch 13 of the metal reinforcement member.

In the condition shown in FIG. 10 which is that which obtains prior to the engine being assembled in the vehicle which is to receive it, the closure 130 is at a distance from the perforator 125 and seals the end piece 119 by means of its ribs 138 and 139 such that the engine filled with cooling liquid and put under pressure for detecting any possible leaks can easily be tested.

Subsequently, when the engine full of cooling liquid is to be assembled on the manufacturing line in the vehicle which is to receive it, the male portion 121 of the connection, which portion may optionally include a sealing ring 160 on its outer periphery, is displaced in the direction of arrow f (FIG. 11) in order to cooperate with the female portion of the connection. During this displacement, the end portion 161 of the hose 112 and having a radial flange 162 penetrates into the cup-shaped closure 130 until the leading end of its portion 161 comes into abutment against the portion 144 of the bottom of the membrane cup. As the motion of the male portion 121 continues in the direction of arrow f, said portion drives the closure 130 towards the perforator 126, and when the perforator makes contact with the zone 151 it begins to tear the membrane 131 and this initial tear then runs along the lines of weakness 150 while the membrane is pressed against the outer face of the tube 118.

Figure 11:
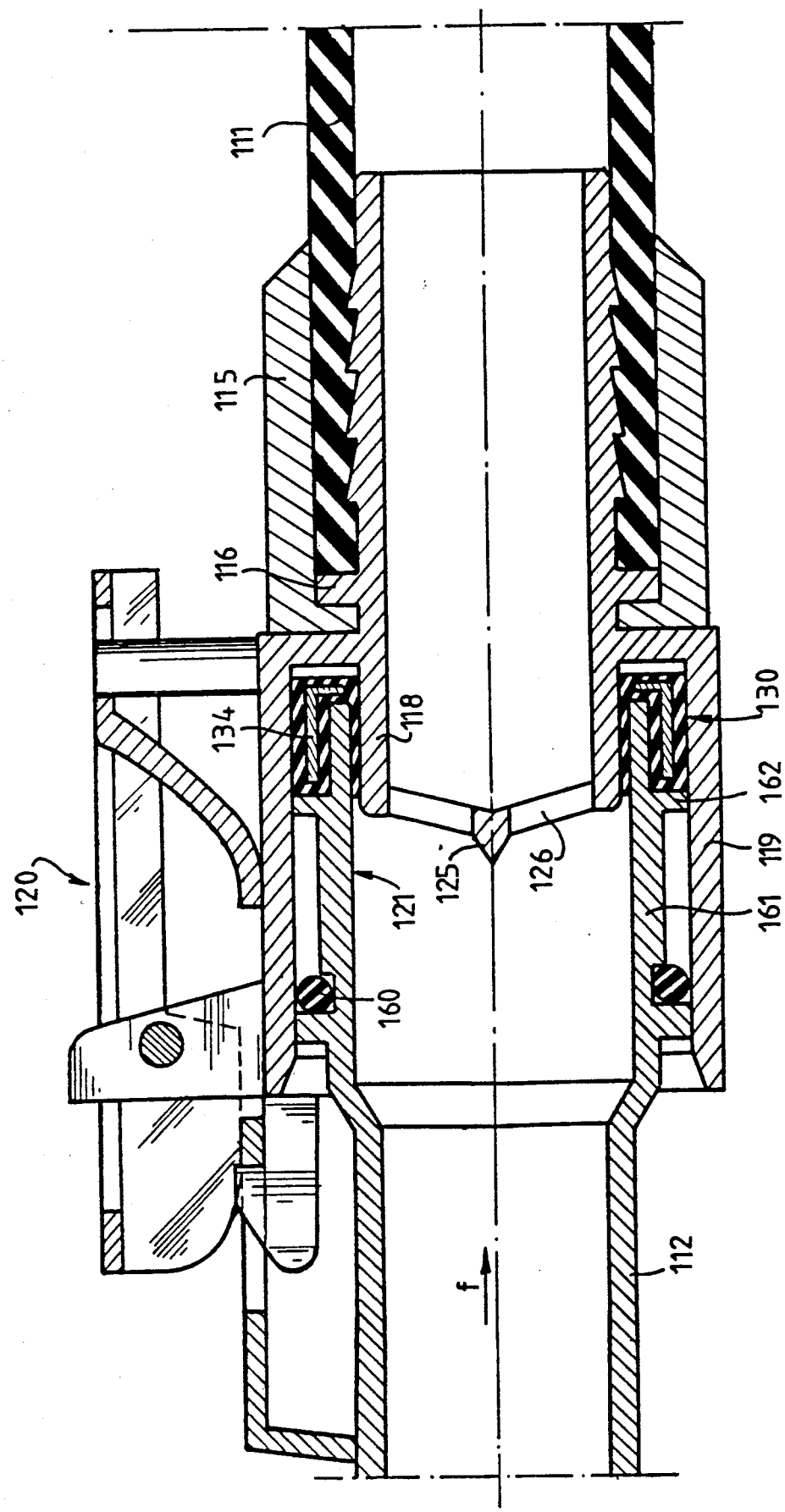
FIG. 11 is a view similar to FIG. 10 showing the end pieces interconnected.

At the end of the engagement motion of the male and female portions of the connection, carrying means 120 become operative and the condition is as shown in FIG. 11, or on a larger scale in FIG. 12, with the membrane 131 of the closure 130 being pressed against the outside surface of the tube 118 and cooperating in sealed manner by means of its ribs 141 and 142 with the outside surface of the portion 161, cooperating with the inside surface of the female portion, thereby providing sealing between the two portions of the connection.

The coupling of the invention in which static sealing is obtained by means of the small-sized ribs 138 and 139 and 141 and 142 means that assembly can be achieved without making any significant effort.

Good results have been obtained using a closure whose side wall diameter is about 32 mm, with the inside diameter of said wall being about 26 mm and with the ribs being about 0.25 mm thick.

We claim:

1. A rapid connection fluid coupling comprising first and second end pieces, each end piece having a fluid passageway therein, said first and second end pieces being interconnectable so that a fluid passageway is defined therethrough, said first end piece being adapted for fitting to a duct such as in the cooling liquid circuit of a motor vehicle engine, a closure coaxially positioned with said fluid passageway of said first end piece, and having a peripheral surface with sealing means thereon for engaging the interior of said passageway of said first end piece for sealing the fluid passageway between first and second end pieces, and means supported by said first end piece and coaxially positioned within said fluid passageway of said first end piece for perforating said closure when said second end piece is moved into interconnection with said first end piece, means associated with said second end piece for engaging said closure and driving said closure with said sealing means sealingly engaging said interior of said passageway of said first end piece into said perforator means when said first and second end pieces are moved into interconnection, and means for holding together the first and second end pieces after the end pieces are coupled together.

2. A rapid connection fluid coupling according to claim 1 wherein said means for holding together said first and second end pieces includes said first end piece having tabs having hook-shaped end portions.

3. A rapid connection fluid coupling according to claim 2 wherein said tabs include a radial flange and a ferrule connected to said flange.

4. A rapid connection fluid coupling in accordance with claim 2 wherein said means for holding together said first and second end pieces includes said second end piece having a collar for receiving therein said hook-shaped end portions of said first end piece.

5. A rapid connection fluid coupling according to claim 1 wherein said closure includes a cup-shaped membrane gasket formed of an elastomer material, said peripheral surface sealing means sealing said fluid passageway being defined on the surface of the cup-shaped membrane gasket.

6. A rapid connection fluid coupling according to claim 1 wherein said cup-shaped membrane gasket includes a side wall portion defining said peripheral surface sealing means that seals said fluid passageway of said first member, said side wall portion having molded circular beading to aid in sealingly engaging said closure within said fluid passageway of said first end member, and a reinforcement member integrally supported by said beading for enhancing stiffness of said membrane.

7. A rapid connection fluid coupling according to claim 6 wherein said reinforcement member is substantially frustoconically shaped and includes a cylindrical end adjacent to said side wall and a free outwardly extending end having tongues sloping relative to the axis of said closure for engaging the inside wall defining the fluid passageway of said first end piece to aid in retaining said closure therewithin.

8. A rapid connection fluid coupling according to claim 5 wherein said cup-shaped membrane gasket includes a bottom surface, means defining zones of weakness on said bottom surface for facilitating tearing thereof, said means defining zones of weakness being disposed in a star pattern having radially extending branches so that when said first and second end pieces are interconnected and said membrane gasket is perforated, said membrane is withdrawn from said fluid passageway.

9. A rapid connection fluid coupling according to claim 5 wherein said cup-shaped membrane gasket includes a molded side wall and an L-shaped reinforcement member supported within said side wall, said sealing means being located on side wall and including inner and outer sealing faces, a plurality of circumferential sealing ribs positioned on the outer sealing face and a plurality of circumferential sealing ribs positioned on the inner sealing face.

10. A rapid connection fluid coupling according to claim 9 wherein said circumferential sealing ribs positioned on said inner sealing face are offset longitudinally relative to said circumferential sealing ribs positioned on said outer sealing face.

11. A rapid connection fluid coupling according to claim 9 wherein said molded side wall includes notches extending into said side wall to said L-shaped reinforcement member to aid in preventing deformation of said L-shaped reinforcement member during molding.

* * * * *